(12) United States Patent
Jensen (10) Patent No.: US 12,336,544 B2
(45) Date of Patent: Jun. 24, 2025

(54) SLAUGHTERED PIG PART PROCESSING PLANT WITH A PIG PART DESKINNER, AND A SLAUGHTERED PIG PART DESKINNER UNIT

(71) Applicant: FRONTMATEC GROUP APS, Kolding (DK)

(72) Inventor: Andreas Iskov Jensen, Sønderborg (DK)

(73) Assignee: FRONTMATEC GROUP APS, Kolding (DK)

(*) Notice: Subject to any disclaimer, the term of this patent is extended or adjusted under 35 U.S.C. 154(b) by 251 days.

(21) Appl. No.: 17/777,858

(22) PCT Filed: Nov. 16, 2020

(86) PCT No.: PCT/EP2020/082245
§ 371 (c)(1),
(2) Date: May 18, 2022

(87) PCT Pub. No.: WO2021/099261
PCT Pub. Date: May 27, 2021

(65) Prior Publication Data
US 2022/0408740 A1 Dec. 29, 2022

(30) Foreign Application Priority Data

Nov. 19, 2019 (DK) .............................. PA201970701

(51) Int. Cl.
*A22B 5/16* (2006.01)
*A22B 7/00* (2006.01)
(52) U.S. Cl.
CPC .............. *A22B 5/166* (2013.01); *A22B 5/161* (2013.01); *A22B 7/001* (2013.01)
(58) Field of Classification Search
CPC ............ A22B 5/16; A22B 5/163; A22B 5/166
See application file for complete search history.

(56) References Cited

U.S. PATENT DOCUMENTS

| 4,327,633 A * | 5/1982 | Leining .................... A22B 5/16 |
| | | 99/589 |
| 4,351,088 A * | 9/1982 | Leining .................. A22B 5/166 |
| | | 99/589 |

(Continued)

FOREIGN PATENT DOCUMENTS

| CN | 109122789 A | 1/2019 |
| EP | 1 135 987 B1 | 4/2003 |

(Continued)

OTHER PUBLICATIONS

First Office Action and Search Report (7 pages) dated May 7, 2020 out of Danish priority Application PA 2019 70701.

(Continued)

*Primary Examiner* — Michael H Wang
(74) *Attorney, Agent, or Firm* — Crowell & Moring LLP; John C. Freeman (57) ABSTRACT

A slaughtered pig part processing plant including a conveyor with at least one retaining assembly for a pig part and a pig part deskinner below the conveyor. The deskinner including a knife and a skin gripper, wherein the
said conveyor is configured for advancing the retaining assembly in a machine direction (T) past the deskinner. A deskinner carrier structure including one or more actuators for moving the deskinner between an upper position and a lower position. The knife and the skin gripper configured for engaging in the upper position skin (S) of the pig part suspended from the retaining assembly advanced to the deskinner by the conveyor, and to progressively cut off and remove the skin (S) when moved to the lower position.

17 Claims, 13 Drawing Sheets

(56) References Cited

U.S. PATENT DOCUMENTS

| | | | |
|---|---|---|---|
| 4,417,367 A | 11/1983 | Leining | |
| 4,433,453 A * | 2/1984 | Leining | A22B 5/166 99/589 |
| 9,004,988 B2 | 4/2015 | Van Der Steen et al. | |
| 9,192,172 B2 | 11/2015 | Van Der Steen et al. | |
| 9,717,257 B2 | 8/2017 | Van Der Steen et al. | |
| 2004/0166793 A1* | 8/2004 | Young | A22B 5/166 452/83 |
| 2012/0315834 A1* | 12/2012 | Van Der Steen | A22B 7/005 452/179 |
| 2013/0029574 A1 | 1/2013 | Van Der Steen et al. | |
| 2016/0037787 A1 | 2/2016 | Van Der Steen et al. | |
| 2016/0174581 A1* | 6/2016 | Van Der Leest | A22B 5/161 452/128 |

FOREIGN PATENT DOCUMENTS

| | | |
|---|---|---|
| EP | 2 018 809 A1 | 1/2009 |
| EP | 2 512 255 A2 | 10/2012 |
| EP | 2 018 809 B1 | 9/2014 |
| EP | 2 911 520 B1 | 12/2016 |
| EP | 3 051 955 B1 | 8/2017 |
| ES | 2 301 373 A1 | 6/2008 |
| WO | WO 2009/070040 A2 | 6/2009 |
| WO | WO 2011/074969 A2 | 6/2011 |

OTHER PUBLICATIONS

International Search Report (four pages) dated Jan. 21, 2021 out of PCT Priority Application PCT/EP2020/082245 filed Nov. 16, 2020.
Written Opinion (six pages) dated Jan. 21, 2021 out of PCT Priority Application PCT/EP2020/082245 filed Nov. 16, 2020.

* cited by examiner

Fig. 6b

SLAUGHTERED PIG PART PROCESSING PLANT WITH A PIG PART DESKINNER, AND A SLAUGHTERED PIG PART DESKINNER UNIT This application is a national application out of Patent Cooperation Treaty Patent Application No. PCT/EP2020/082245, filed on Nov. 16, 2020, the entire contents of which are incorporated herein by reference.

This application claims under 35 U.S.C. § 119 (a) the benefit of the filing date of Denmark Patent Application No. PA201970701, filed on Nov. 19, 2019, the entire contents of which are incorporated herein by reference.

BACKGROUND OF THE INVENTION

Field of the Invention

The present invention relates to a pig part processing plant, and in particular to such plants having a deskinner.

Related Art

Deskinning is the process of removing the skin and optionally some membrane and fat from pork products. One well known process for this is the Townsend Skinning principle invented in the 1940's, using a device with a knife and toothed roll, on which device the pork product is placed and moved, with the toothed roll pulling off the skin cut off by the knife.

An object of the present invention is inter alia to provide an improved pig part processing plant wherein in a simple manner suspended pig parts may be deskinned using a deskinner operable in a novel manner.

SUMMARY

Thus, a plant of the invention includes a first conveyor with at least one retaining assembly for a pig part, a deskinner below the conveyor, the deskinner including a knife and a skin gripper, a deskinner carrier structure including one or more actuators for moving the deskinner between an upper position and a lower position, the first conveyor configured for continuously advancing the retaining assembly in a machine direction past the deskinner. The knife and the skin gripper are configured for engaging in the upper position the skin of a pig part suspended from the retaining assembly advanced to the deskinner by the conveyor, and to progressively cut off and remove the skin when moved to the lower position.

A deskinner unit according to the invention includes a deskinner with a knife and a skin gripper, a deskinner carrier structure carrying the deskinner and including one or more actuators for moving the deskinner between an upper position and a lower position. The knife and the skin gripper are configured for engaging in the upper position the skin of a pig part suspended from above the deskinner unit and to progressively cut off and remove the skin when moved to the lower position.

It has been found that an efficient deskinning of suspended pig parts is possible even though the retaining assembly carrying the pig part moves continuously by the first conveyor, whereby the deskinner unit does not need to move with the pig part in the machine direction during the deskinning.

Preferred embodiments providing significant benefits in solving particular problems are defined in the dependent claims.

BRIEF DESCRIPTION OF THE DRAWINGS

FIG. 1b is a top view of the plant of FIG. 1a, FIG. 1c is a perspective view of a first and second section of the plant of FIG. 1a, FIG. 2 is a perspective view of an embodiment of a retaining assembly in the form of a clamp in accordance with the present invention.

DETAILED DESCRIPTION

The invention will now be explained in more detail below.

Figure 1A:
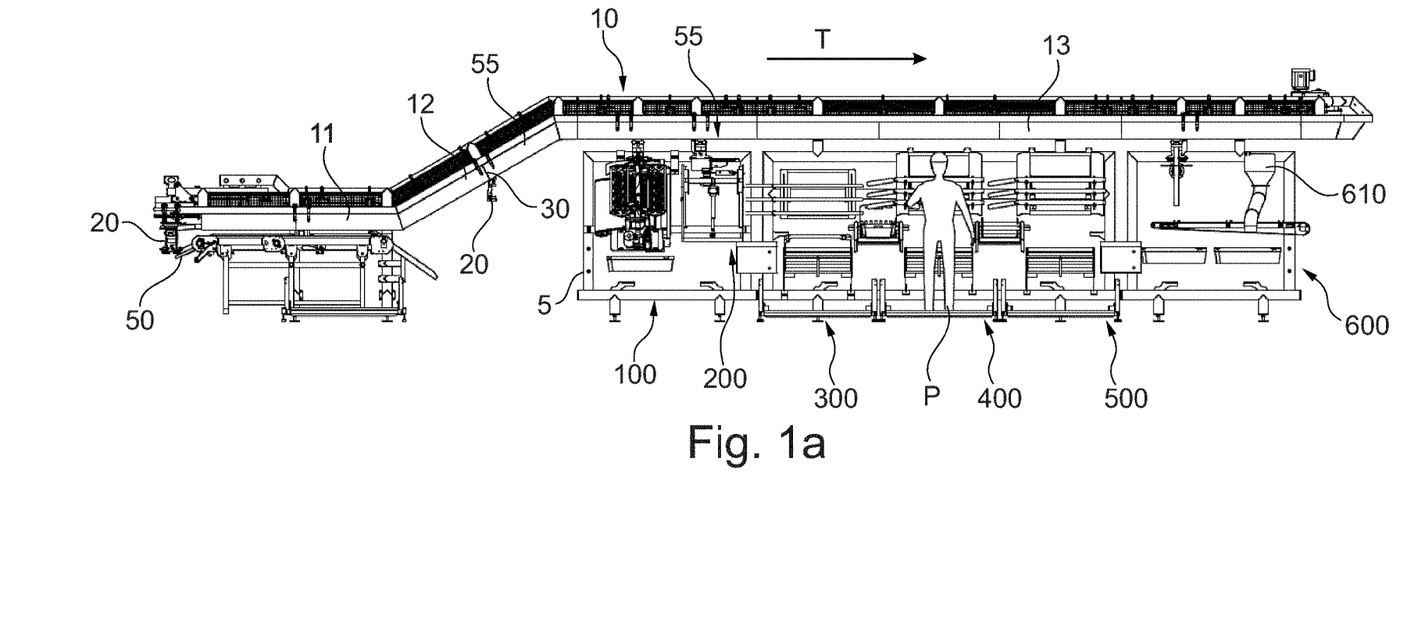
FIG. 1a is a side view of an embodiment of a slaughtered pig part processing plant, with a work station including a deskinner in accordance with the present invention.

FIG. 1a generally shows a side view of a slaughtered pig part processing plant 1 including an elongated frame 5 supporting a first, overhead conveyor 10 that carries and advances a plurality of spaced apart pig part retaining assemblies shown generally by numeral 20.

Figure 2:
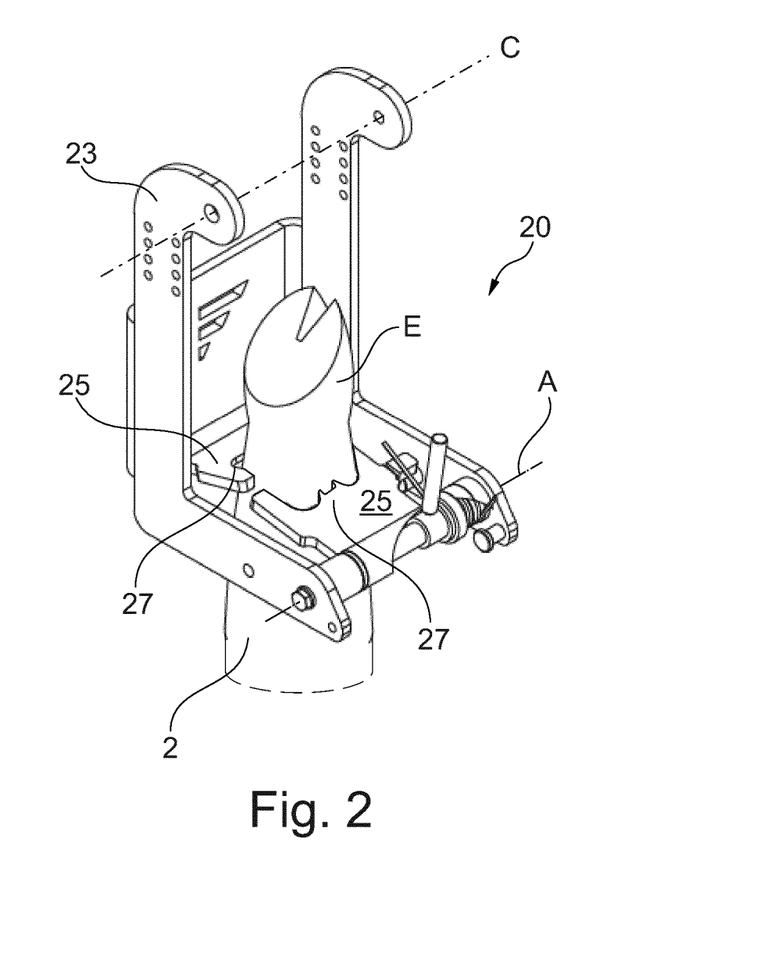

The pig part retaining assemblies 20, from which the pig parts hang suspended as they are processed, may in one embodiment be of the clamp type, as shown in FIG. 2. However, the skilled person will appreciate that other types of pig part retaining assemblies, such as of slot plate type, shown by way of example in FIG. 21 of EP2512255, may be used.

Each retaining assembly 20 is configured for locally engaging the extremity E, such as the bone as shown in FIG. 2, and the pig parts 2 are advanced by the first conveyor 10 in a general machine direction T from a first station 40, where the extremity E of the pig part 2 is introduced automatically or manually into the retaining assembly 20, to a last station 600 where the extremity E of the processed pig part 2 is removed automatically from the retaining assembly 20 and discharged via a chute 610. The pig part 2 may by way of example be a leg or shoulder part, such the hind shank with the hind foot or the fore shank.

Between the first station 40 and the last station 600 is a sequence of processing stations 100, 200, 300, 400, 500 for operators P performing various cutting operations and for removing meat from the bone of the individual, suspended pig parts 2. In the shown embodiment the first conveyor 10 of the plant 1 has a first section 11 extending at a relatively low level, and a second section 12 extending upwards to an overhead third section 13 extending above and next to the plurality of processing stations 100, 200, 300, 400, 500 as well as the last station 600. Normally, the conveyor 10 runs continuously, with the retaining assemblies 20 moving slowly past the processing stations as the pig parts 2 suspended therefrom are being processed.

Figure 1B:
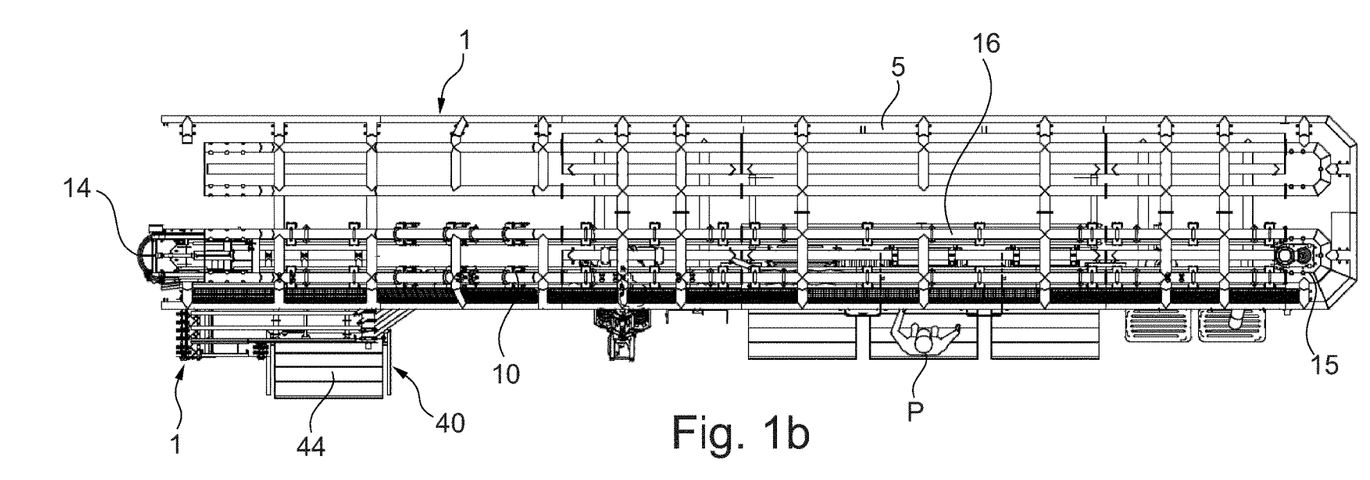

As seen best in FIG. 1b, which is a top view of the plant of FIG. 1a, the conveyor 10 has a return part 16 returning the empty retaining assemblies 20 from the last station 600 to the first station 40 and extending between redirecting sections 14, 15. Preferably, the conveyor 10 is an endless structure, such as a chain, carrying the retaining assemblies 20 via respective couplings 30 and driven and guided by any conventional means, such as by rollers located at the redirecting sections 14, 15.

In one embodiment shown in FIG. 1b, two independently operating processing plants 1 as described above may have their respective first conveyors 10 positioned alongside each other, and may be operating with a respective one of the different types of retaining assemblies 20 described above, one plant 1 for instance processing hind shanks and the other plant 1 processing fore shanks. Meat discharge conveyors may be arranged below and between the adjacent return parts 16 of the two independently operating processing plants 1, so as to receive and discharge cut off meat from both plants 1.

FIG. 2 shows an embodiment of a retaining assembly in the form of a clamp 20. The clamp 20 is normally of a food compatible material, such as stainless steel or a synthetic material, and generally includes two jaws 25, at least one being pivotable about the shown axis A. The jaws 25 each have an elongated gripping edge 27 that preferably is serrated or sharpened. Generally, the retaining assemblies 20 may each being mounted for rotation about a vertical axis D (see FIG. 3a) and about a horizontal axis C. The plant 1 may be configured with guides 55 alongside the conveyor 10 to provide for a turning of the retaining assemblies 20 about the vertical axis D as they move past selected ones of the processing stations 100, 200, 300, 400, 500, such as by an angle of +/−90°.

Figure 1C:
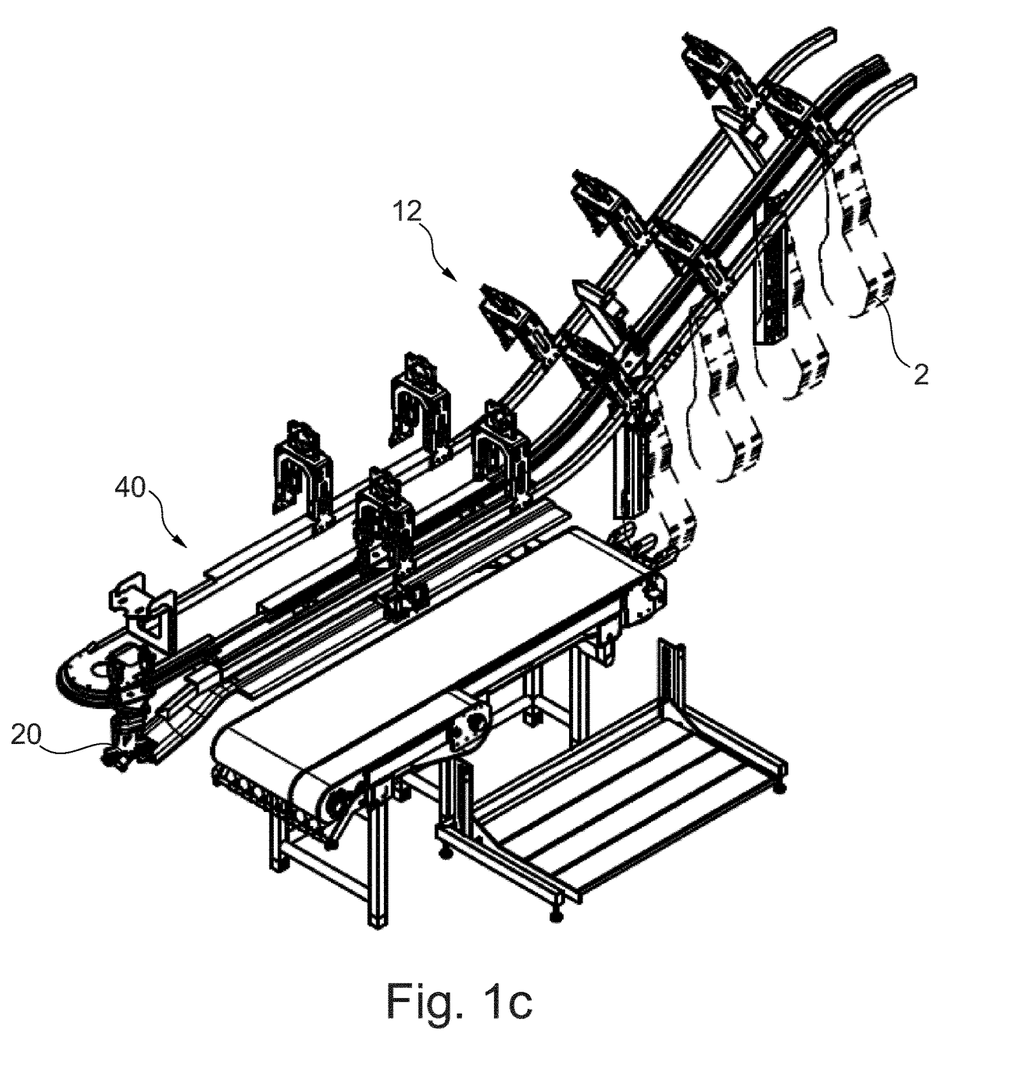

FIG. 1c is a perspective view of the first station 40, showing also a suspended pig part 2 being advanced from the first station 40 along the first conveyor second section 12, held by a retaining assembly 20. At the first station 40 the retaining assemblies 20 may be turned about the horizontal axis C by engaging a guide 50, in the shown embodiment for the advanced retaining assemblies 20 to rest against a table or against a conveyor 44 running parallel with the first conveyor 10, ready in this position to receive an extremity E of a pig part 2. For the clamp 20 shown in FIG. 2 the tip of the extremity E is pressed against the jaws 25 to spread them apart following which the extremity E is pushed further in between the jaws 25. As the retaining assembly 20 is advanced further to leave the table or conveyor 44 the retaining assembly 20 turns back about the horizontal axis C, with the pig part 2 hanging freely from the retaining assembly 20.

Figure 3A:
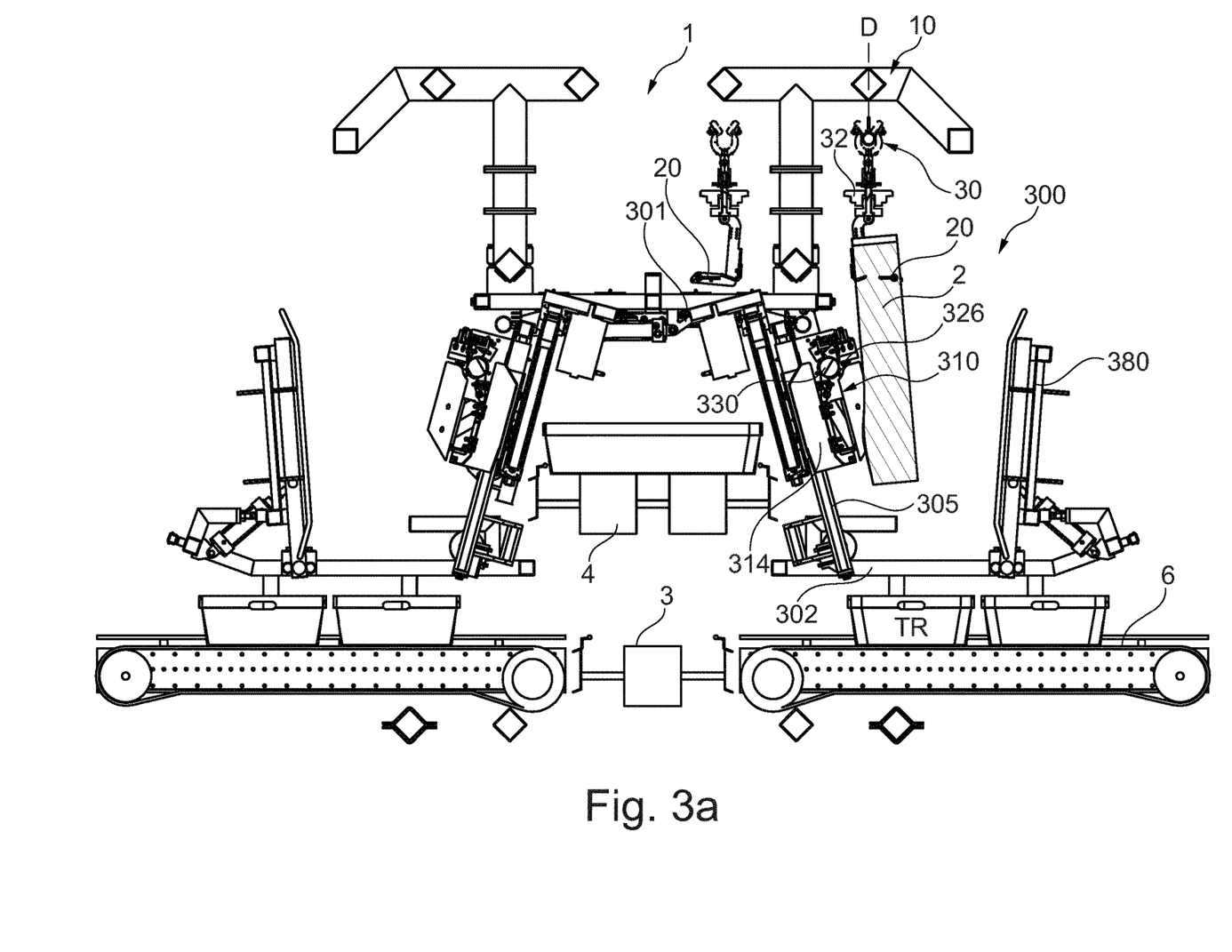
FIGS. 3a and 3b is a sectional and perspective view of an embodiment of the plant of FIG. 1a with an embodiment of a deskinner, and an embodiment of a pressing device, respectively, in accordance with the present invention.
Figure 3B:
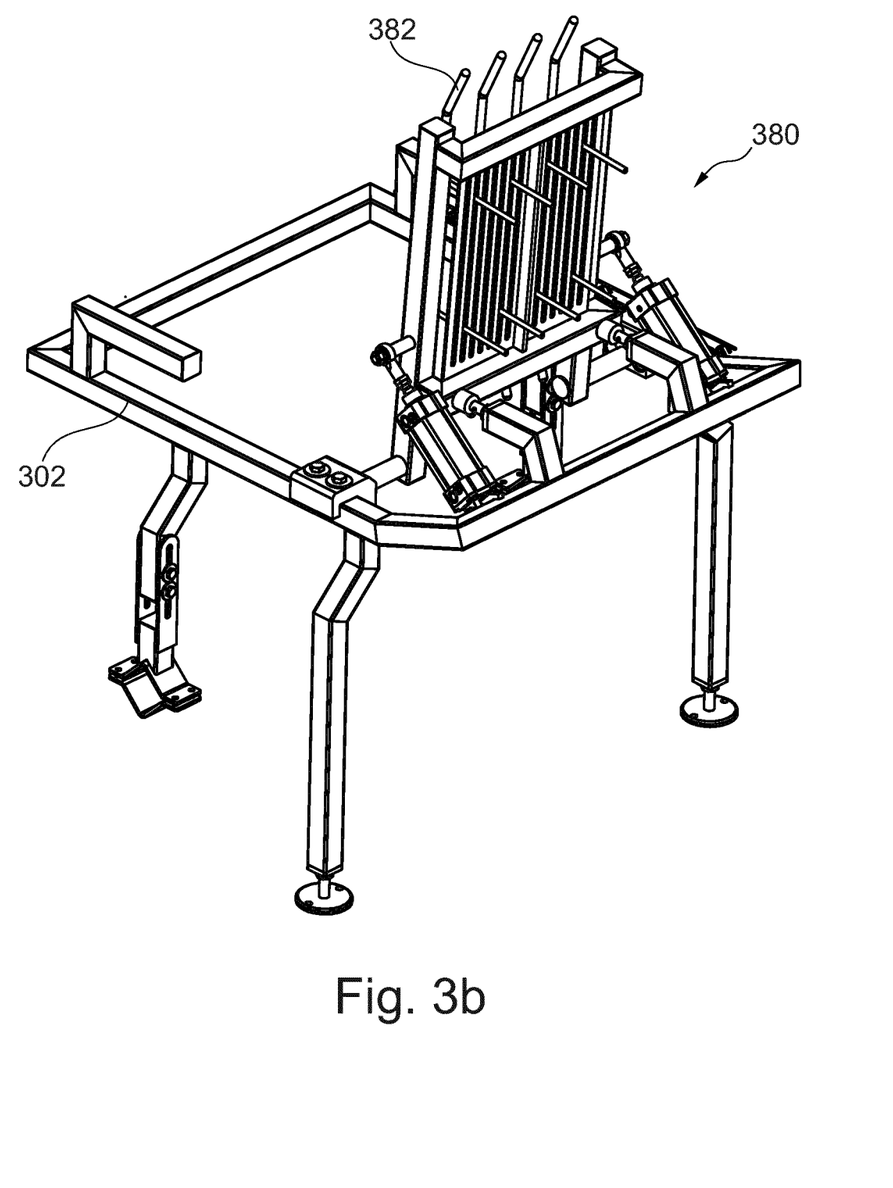

FIG. 3a shows a slightly modified embodiment of the plant 1 of FIG. 1a, illustrating the clamps 20 shown in FIG. 2 being advanced by the first conveyor 10 past one of the processing stations. The couplings 30 each have an upper structural part 36 allowing for a turning of a lower structural part 32 of the couplings 30 about a vertical axis D. The clamp 20 or other retaining assembly is connected to the lower structural part 32 so as to allow for a turning movement about the aforementioned, generally horizontal axis C. The shown modified plant 1 has second and third meat discharge conveyors 3, 6 as well as a fourth conveyor 4 for supplying empty trays, all extending at levels below the first conveyor 10 and adapted for conveying meat cut off from the pig parts 2 to a facility (not shown) for further processing, either in meat trays or supported directly by the second and third conveyors 3, 6, and to supply empty meat trays TR to the individual processing stations 100, 200, 300, 400, 500. The second conveyor 3 runs along the length of the first conveyor 10 while the third conveyor runs perpendicularly thereto, to deliver trays TR to the second conveyor 3.

A pig part 2 deskinner unit U of the present invention may by way of example define the station indicated by numeral 300 in FIG. 1a, or any other one of the shown stations 100, 200, 400, 500, depending on the overall sequence of processing of the pig parts 2 in the processing plant 1. The deskinner unit U and its various components or parts, including the deskinner 310 proper, are shown in FIGS. 3a through 6b, and it is arranged to process a pig part 2 that has been advanced to the deskinner unit U by the first conveyor 10. Note that in the drawings two deskinner units U are shown, arranged back-to-back and each serving a respective one of the two shown pig processing plants 1.

The deskinner unit U is preferably configured to provide a clamping force onto a lower portion of the suspended pig part 2, so as to temporarily fixate this portion for processing at the station 300. The deskinning at the deskinner unit U is a relatively simple process that may be carried out at in a relatively short time, such as 2-4 seconds, within which the retaining assembly 20 will only have moved forward a short distance, such as by around 2-4 cm. The general inherent flexibility of the pig part 2 meat relative to the pig part 2 bone, and/or the ability of its extremity E to turn slightly where it is being held locally by the retaining assembly 20, and/or any slack where the coupling 30 is connected to the conveyor 10 will allow for the lower portion of the pig part 2 to remain in place relative to the deskinner during the deskinning, even as the extremity E is continuously moved forward by the first conveyor 10 in the machine direction T, i.e. no significant, if any, shifting takes place of the position relative to the deskinner unit U of the lower portion of the pig part 2.

Figure 5A:
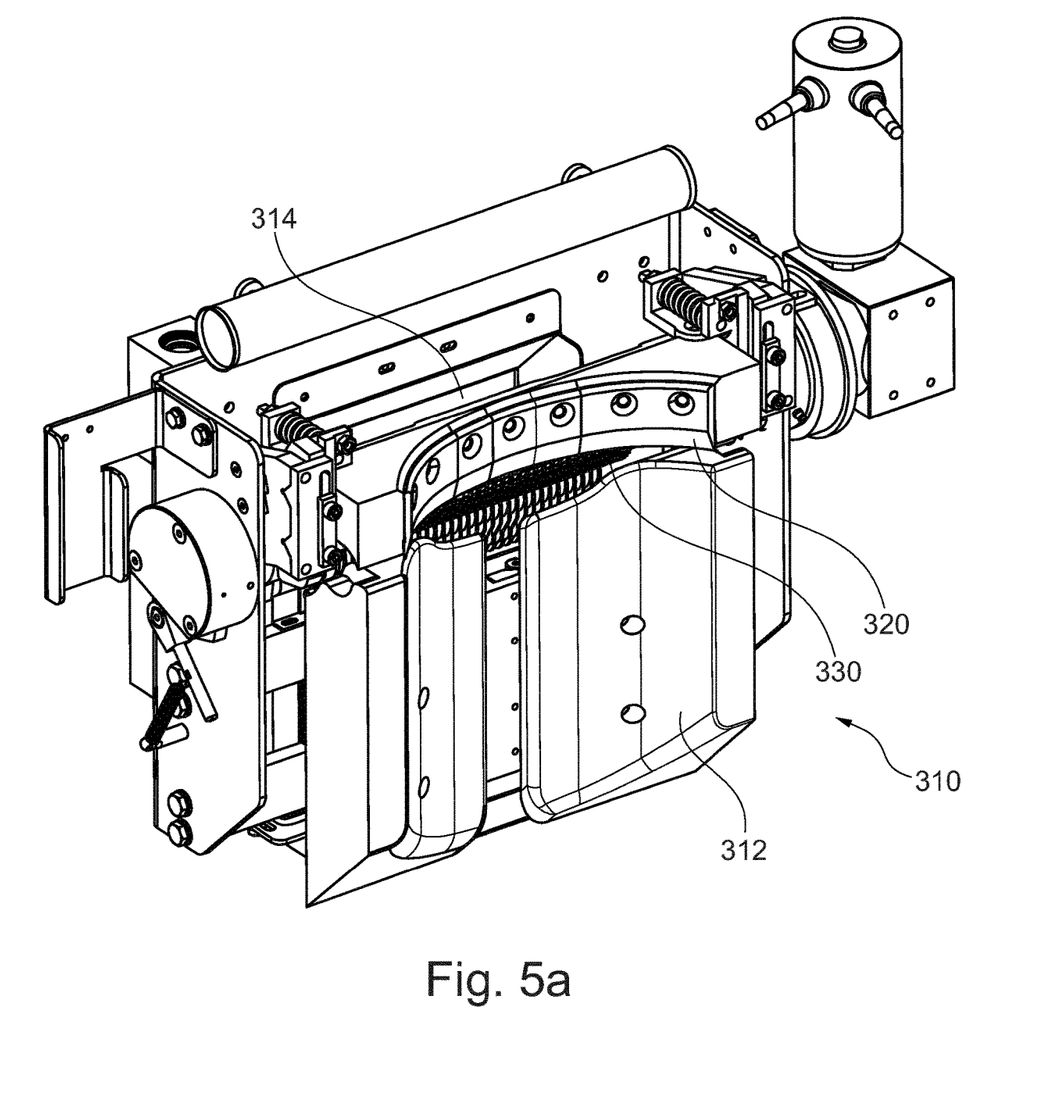
FIGS. 5a-5c show an embodiment of the deskinner in a perspective and front view, respectively, and an enlarged area of the deskinner in accordance with the present invention.

For the aforementioned clamping force the deskinner unit U may include a movable pressing device 380, optionally with flexible pressing fingers 382, for pressing the pig part 2, suspended from above, against the face of a pig part support 312 of the deskinner 310, seen best in FIG. 5a, when the pig part 20 is in position next to the deskinner 310.

In the case of hind or fore shanks 2, the suspended pig parts 2 for deskinning have a rounded, somehow convex surface contour, as shown schematically in FIG. 1c and in FIG. 13B of EP2512255, and so the pig part support 312 may as shown in FIG. 5a herein have a rounded/concave, corresponding contour. The contour of a deskinner 310 blade knife 320 (seen best in FIG. 5a) is similarly selected, such that a substantial portion of the skin S of the front and sides of the pig part 2 may be engaged by the knife 320 and cut off, as explained below.

Figure 4A:
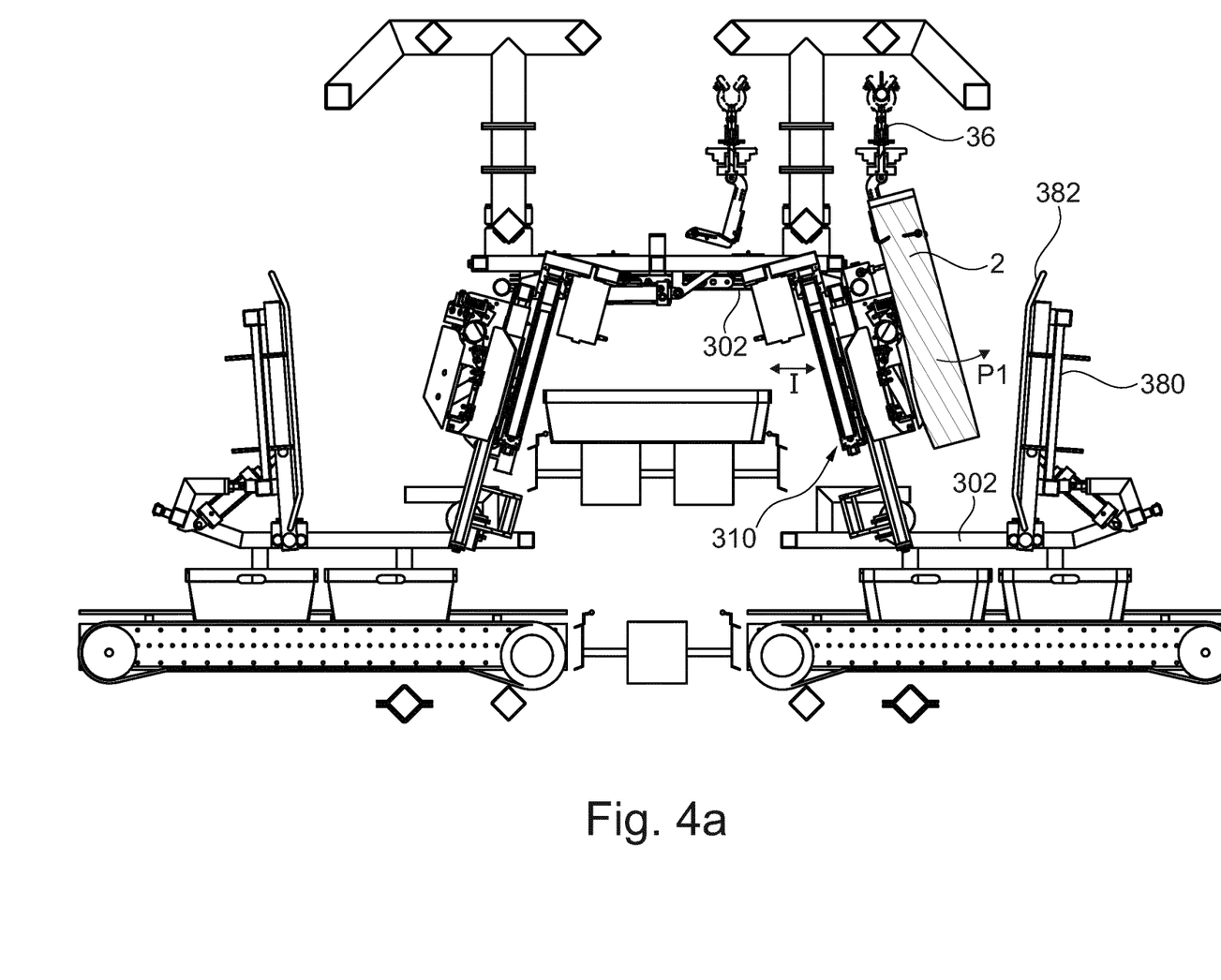
FIGS. 4a-4c show the plant of FIG. 3a with the deskinner in different positions.
Figure 4B:
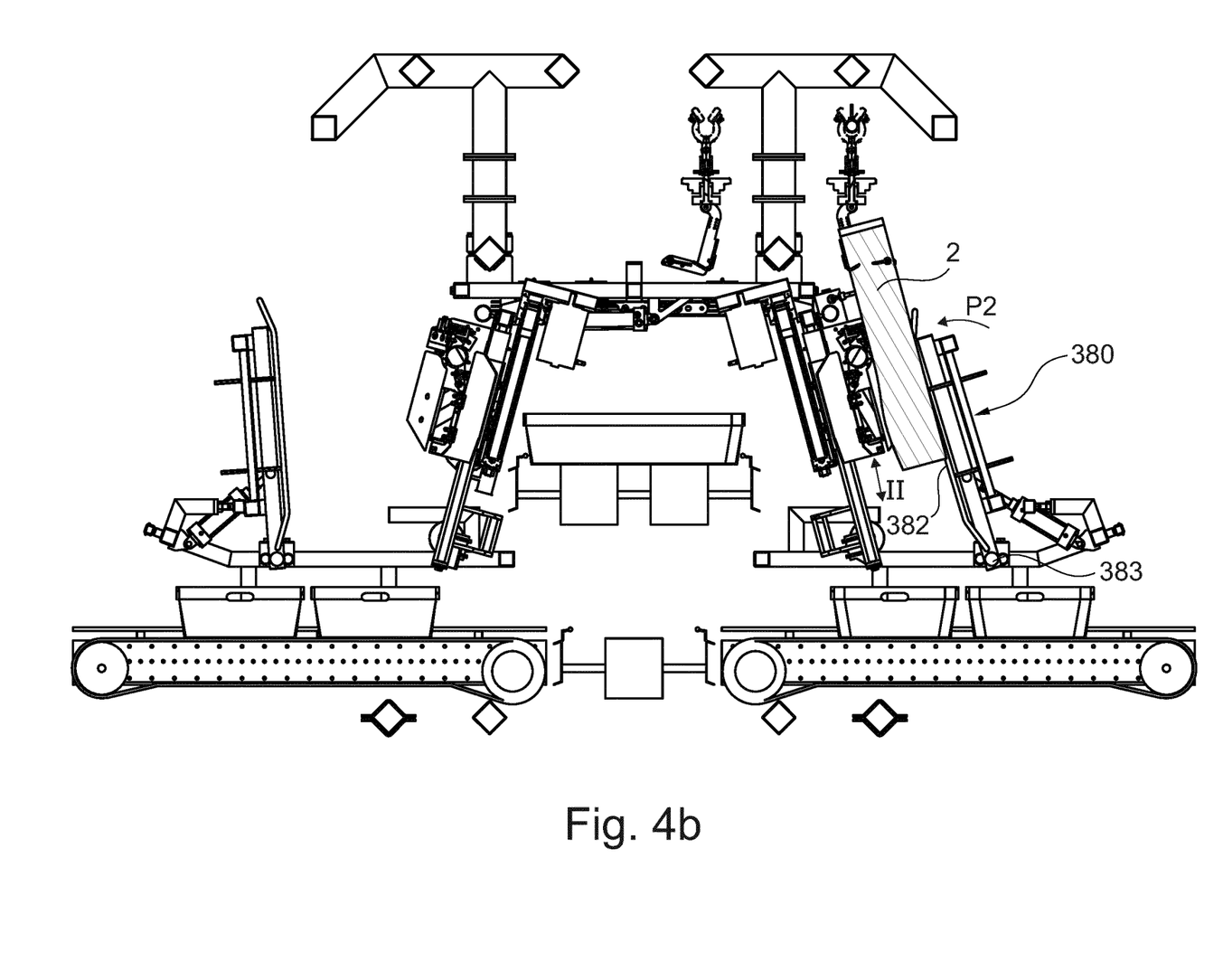
Figure 4C:
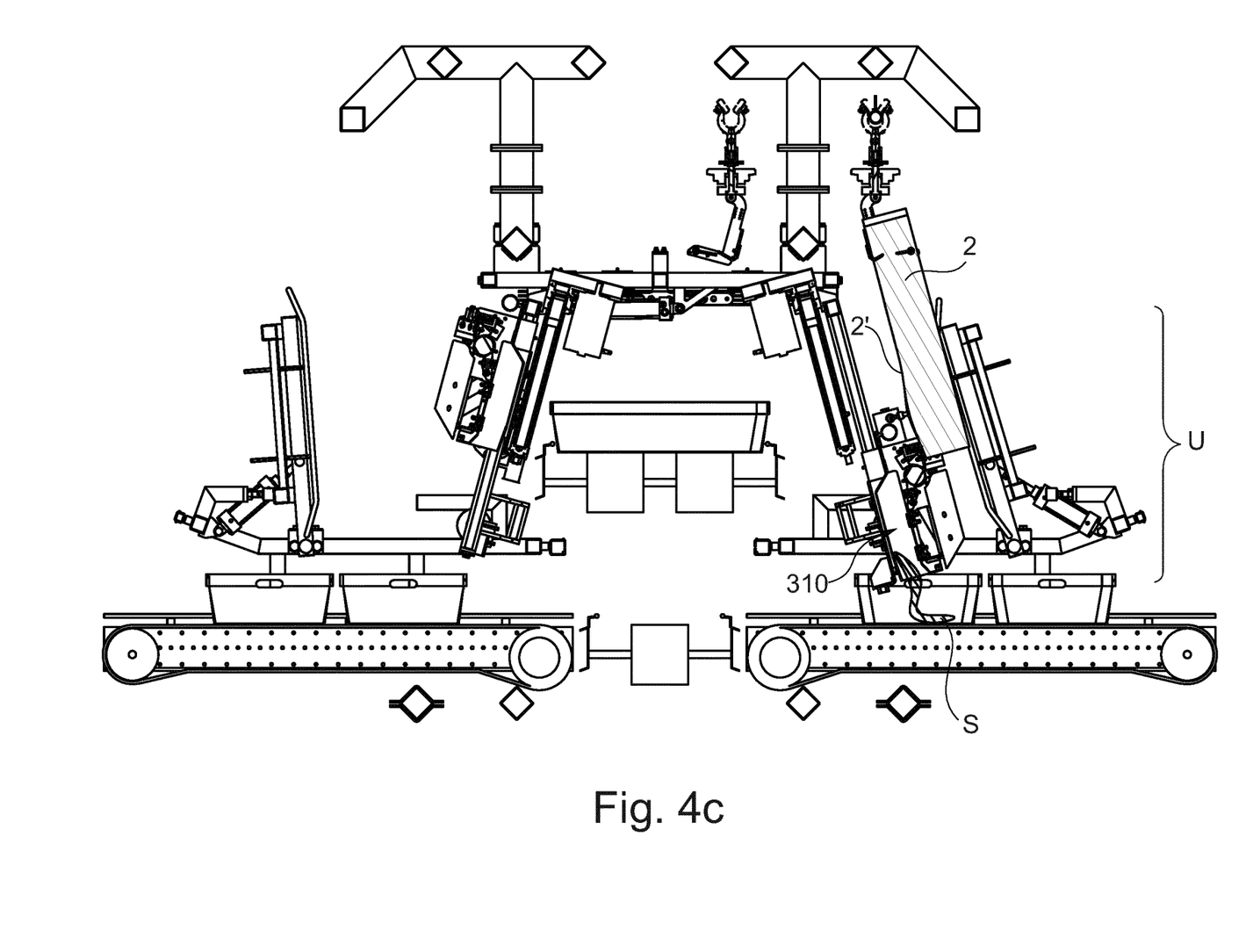

Generally, the deskinner unit U includes the deskinner 310 proper which includes the knife 320 and a skin gripper 330, displaceably mounted onto a deskinner carrier structure 302, 305 carrying the deskinner 310 and including one or more actuators 301 for moving the deskinner 310 relative to the carrier structure 302, 305 between an upper position and a lower position for carrying out the deskinning by the knife 320 slicing off the skin of the pig part 2 as the deskinner 310 is moved to the lower position, as explained below with reference to FIGS. 4a-4c. A portion 302 of the carrier structure may be defined by, or support/include, the pressing device 380 shown in FIG. 3b. The carrier structure 302, 305 may be mounted to the frame 5 of the plant 1.

The carrier structure 302, 305 may also include guideways and one or more actuators for moving the deskinner 310 in a generally horizontal direction between a first, retracted position, shown in FIG. 3a and a second, advanced position, relative to the carrier structure 302, 305. However, the carrier structure 302, 305 as such may alternatively be arranged to be moved between the first and second positions by actuators mounted onto the frame 5 of the plant 1, such as by being supported by wheels. The horizontal movement of the deskinner 310 allows for the pig part 2 to be received between the deskinner and the pressing device 380, and for the pig part 2, whenever necessary, to be moved freely past the deskinner unit U without any processing, without the deskinner unit U being in the way.

Figure 5B:
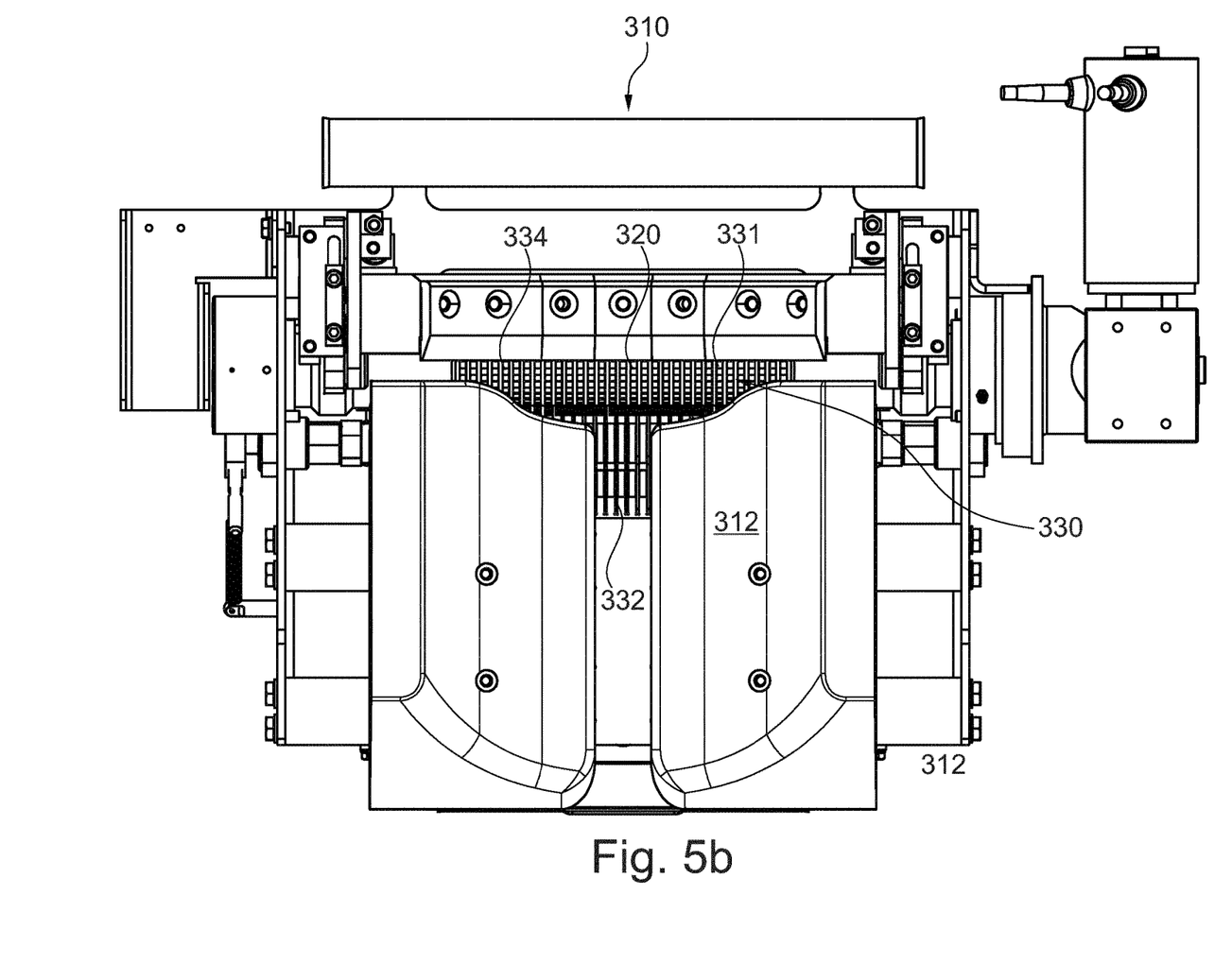
Figure 5C:
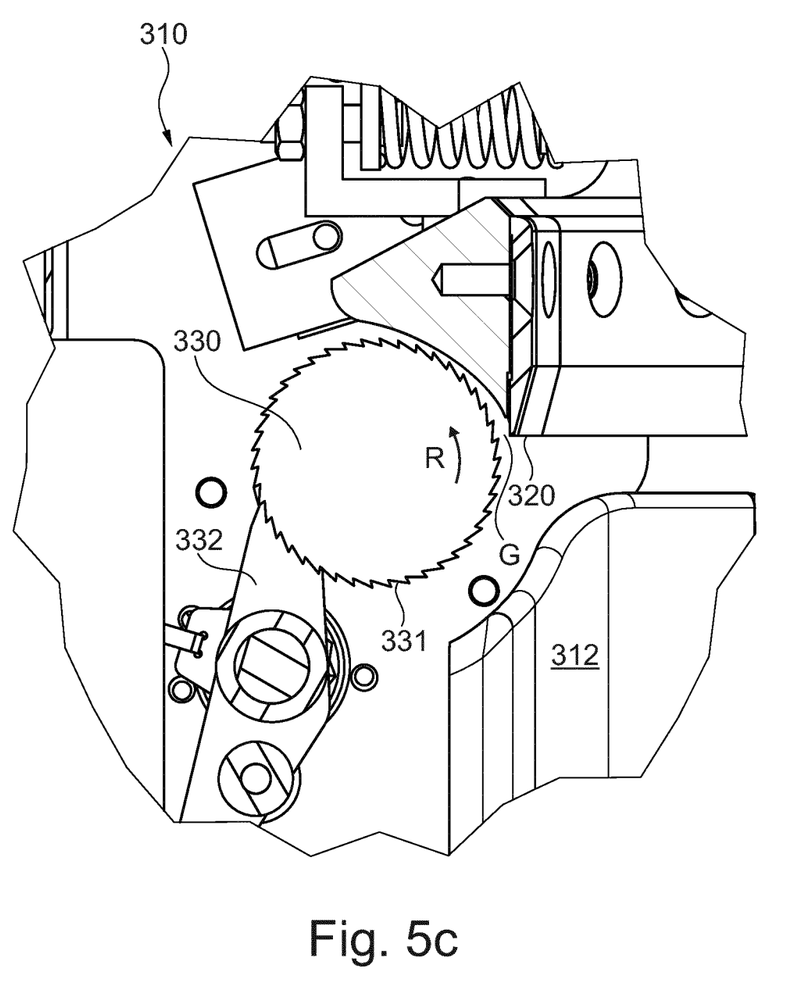

A skin gripper 330 of the deskinner 310 serves to remove skin cut off by the knife 320 in a controlled manner, and preferably comprises a rotatable roller with teeth 331, seen best in FIG. 5c, the deskinner 310 preferably including a drive for rotating the roller 330 in direction R at a speed coordinated with the speed at which the deskinner 310 and, hence, the knife 320, moves down to its lower position. Moreover, the deskinner 310 preferably includes a chute 314 for delivery by gravity of cut off skin S from the skin gripper 330 into a tray TR positioned on the third conveyor 6 which, as shown in FIG. 3a, extends below the deskinner 310.

FIG. 4a shows the deskinner 310 moved in the horizontal direction indicated generally by arrow I, into an advanced position to the right. In this position the pig part support 312 contacts the pig part 2 and the pig part 2 may, as shown, swing slightly in the direction indicated by arrow P1, such as by a turning movement about the axis C of the retaining assembly 20. As shown in FIG. 4b the clamping device 380 is then turned in the direction of the shown arrow P2, to give rise to a clamping of the pig part 2, to fix the pig part 2 for the purpose of the subsequent deskinning operation where the deskinner 310 is moved to its lower position.

FIG. 4c shows the deskinner in the lower position where skin S facing the pig part support 312 has been cut off by the knife 320, with the skin S collected in a tray TR. The deskinned pig part 2 with exposed meat or fat surface 2' is then moved forward to the next processing station by the continuous movement of the retaining assembly 20, as soon as the withholding force applied by the clamping device 380 is no longer strong enough, which may be at a time when the gripping device 380 is moved back and/or the deskinner is moved towards the retracted position shown in FIG. 3a.

FIG. 5a-5c show the deskinner 310 including the aforementioned chute 314. As seen in FIGS. 5b and 5c the skin gripper 330 roller has teeth 331 positioned around the periphery, preferably arranged as peripheral rings 320 spaced apart by gaps 334 into which may extend blades 332 (se FIG. 5c) acting to release the skin S from the teeth 331 without restricting rotation of the roller 330.

Figure 6A:
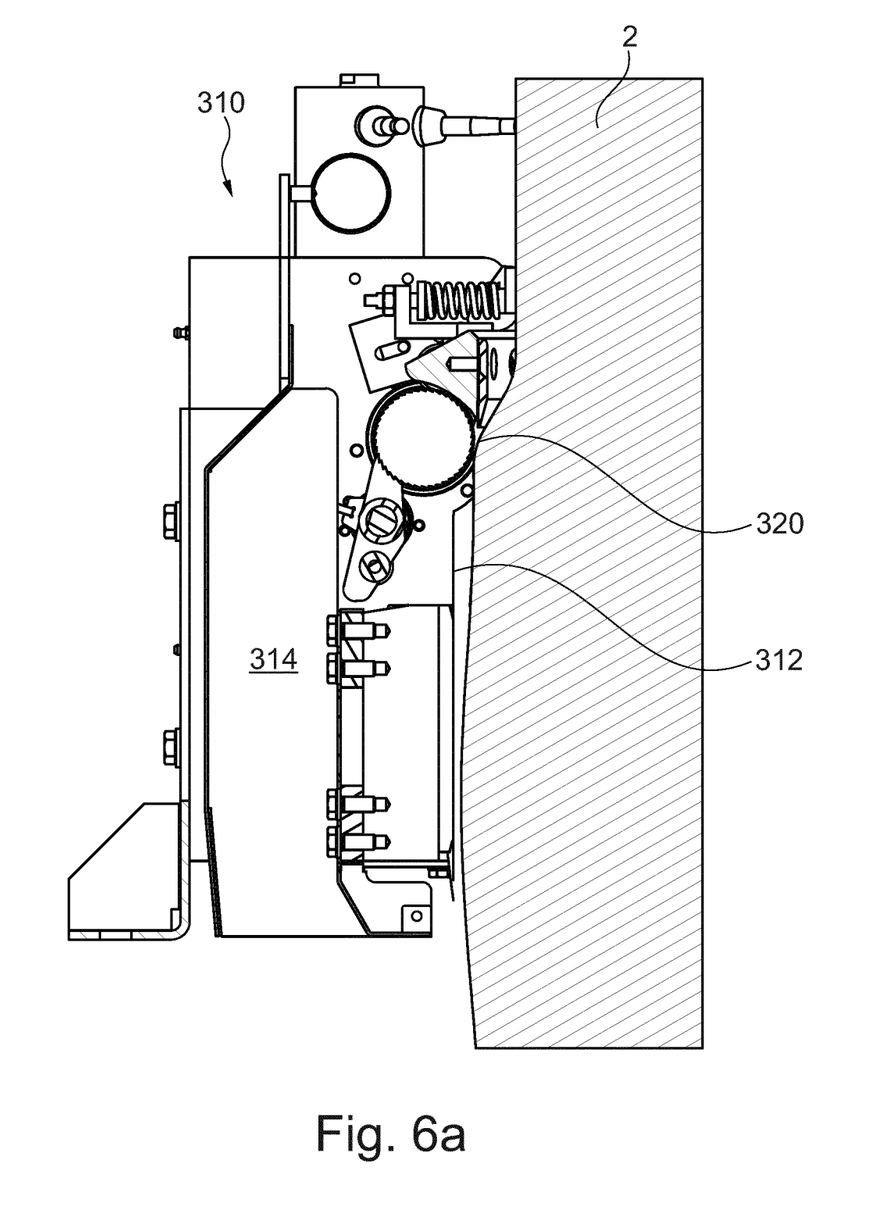
FIGS. 6a and 6b show the deskinner before and during the deskinning of a schematically shown pig part.
Figure 6B:
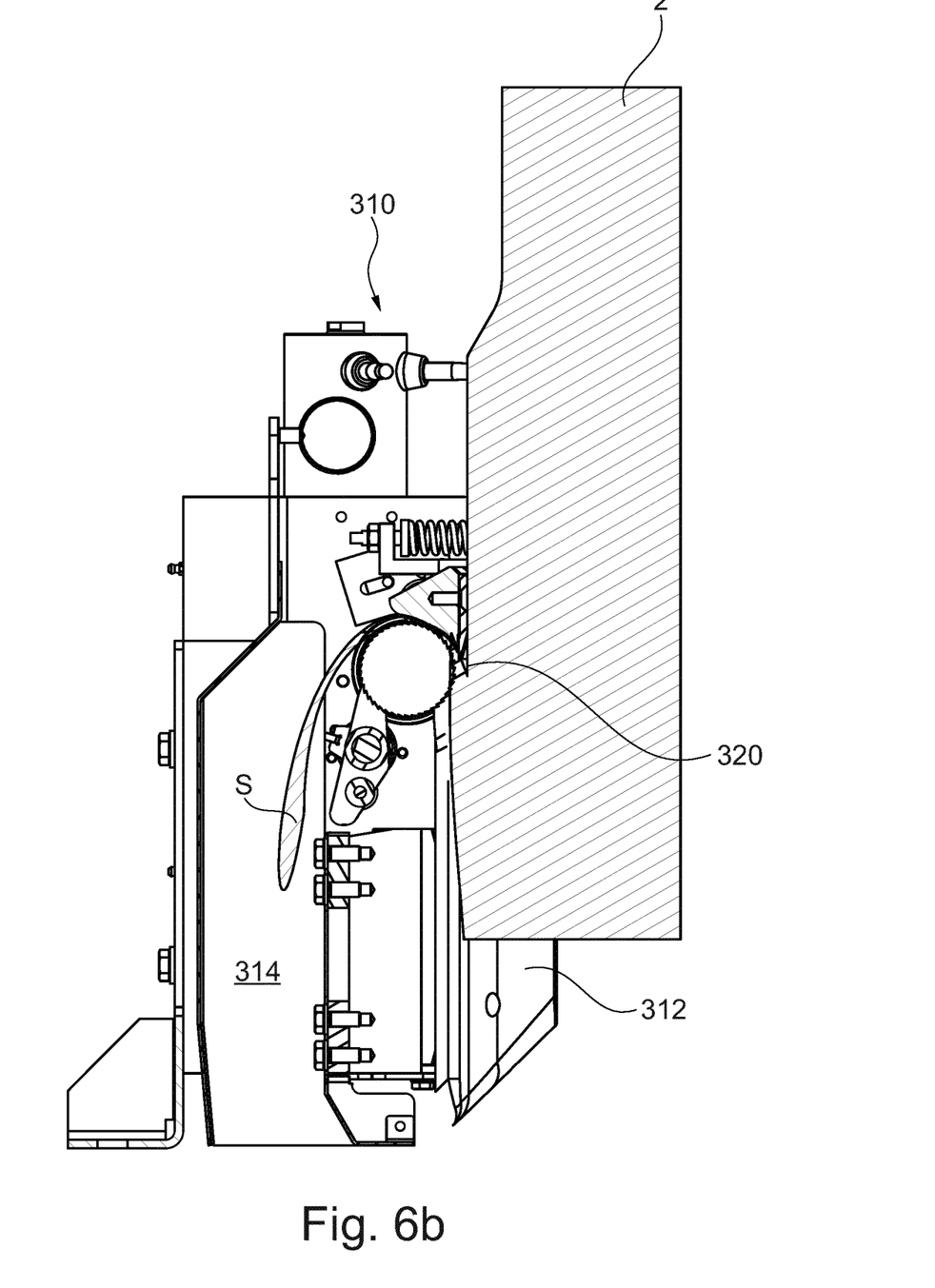

As seen best in FIG. 5c a gap G is defined between the roller 330 and the knife 320, which gap G receives the cut off skin S, as best seen in FIG. 6b. The pig part support 312 may be formed as a single body, but is in the shown embodiment defined by two, spaced apart individual segments, see FIG. 5b, that have respective curved upper edges, assisting together in providing an even more reliable pulling by the roller of the skin S into the gap G. The position of the two segments may be adjusted individually relative to the knife 320, such as up and down, and in a direction to and from the chute 314 to allow for an adjustment of the thickness of the skin S cut off by the knife 320.

As may be understood, with the invention an efficient deskinning of suspended pig parts 2 has surprisingly been found possible even though the retaining assembly 20 carrying the pig part 2 moves continuously by the first conveyor 10, whereby the deskinner unit U does not have to move with the pig part 2 in the machine direction T during the deskinning. Obviously, it may be possible to carry out a movement of the deskinner unit U in the machine direction T as the deskinning takes place, i.e. as the knife 320 moves to the lower position; however, in the preferred embodiment the deskinner unit U remains stationary.

The invention claimed is:

1. A slaughtered pig part processing plant for processing a shank of a pig, the slaughtered pig part processing plant comprising:
   a conveyor with at least one retaining assembly for a shank of a pig;
   a deskinner below said conveyor, said deskinner comprising a knife and a skin gripper;
   a deskinner carrier structure comprising one or more actuators for moving said deskinner relative to said shank of said pig between an upper position and a lower position;
   said first conveyor configured for continuously advancing said at least one retaining assembly in a machine direction past said deskinner;
   said knife and said skin gripper configured for engaging in said upper position skin of said shank of said pig suspended from said at least one retaining assembly advanced to said deskinner by said conveyor, and said knife progressively cutting off said skin when said deskinner is moved towards said lower position relative to said shank of said pig and said skin gripper progressively removing said skin and discharging said skin from said deskinner when said deskinner is moved relative to said shank of said pig towards said lower position; and
   wherein said deskinner comprises a pig part support arranged below said knife and configured to provide a sideways support for said shank of said pig suspended from said at least one retaining assembly that is continuously advanced past said deskinner by said conveyor while said knife progressively cuts off said skin.

2. The slaughtered pig part processing plant of claim 1, comprising one or more actuators configured for moving said deskinner sideways relative to said machine direction between a retracted position and an advanced position closer to said shank of said pig suspended from said at least one retaining assembly advanced to said deskinner by said conveyor.

3. The slaughtered pig part processing plant of claim 1, wherein a position of said pig part support relative to said knife being adjustable.

4. The slaughtered pig part processing plant of claim 3, wherein said pig part support is defined by individually adjustable segments arranged to support a leading edge and a trailing edge, respectively, of said shank of said pig when said knife is moved to said lower position.

5. The slaughtered pig part processing plant of claim 1, wherein said deskinner comprises a pressing device for pressing said shank of said pig suspended from said at least one retaining assembly advanced to said deskinner by said conveyor against said pig part support.

6. The slaughtered pig part processing plant of claim 1, said skin gripper being a rotatable roller with teeth, wherein a gap is defined between said rotatable roller and said knife receiving said skin that has been cut off.

7. The slaughtered pig part processing plant of claim 1, wherein said skin gripper comprises a chute for delivery by gravity said skin from said skin gripper.

8. The slaughtered pig part processing plant of claim 7, comprising a second conveyor arranged below said chute to receive said skin from said chute, said second conveyor being arranged to convey said skin along a direction transverse to said machine direction.

9. The slaughtered pig part processing plant of claim 8, comprising a third conveyor extending along and below said conveyor.

10. The slaughtered pig part processing plant of claim 3, said conveyor supporting, via respective couplings, a plurality of said at least one retaining assembly, each of said plurality of said at least one retaining assembly being mounted for rotation about a vertical axis and/or about a horizontal axis, said slaughtered pig part processing plant further comprising guides for turning said plurality of said at least one retaining assembly about at least one of said vertical axis and said horizontal axis at selected positions along said conveyor.

11. A pig shank deskinner unit comprising:
a deskinner comprising a knife and a skin gripper;
a deskinner carrier structure carrying said deskinner and comprising one or more actuators for moving said deskinner relative to a pig shank between an upper position and a lower position;
said knife and said skin gripper configured for engaging in said upper position skin of said pig shank suspended from above said pig shank deskinner unit and to progressively cut off and remove said skin when moved to said lower position;
said knife progressively cutting off said skin when said deskinner is moved towards said lower position;
said skin gripper progressively removing said skin and discharging said skin from said deskinner when said deskinner is moved towards said lower position; and
wherein said deskinner comprises a pig part support arranged below said knife and configured to provide a sideways support for said pig shank suspended from above said pig part deskinner unit, when said deskinner moves towards said lower position.

12. The pig shank deskinner unit of claim 11, said deskinner carrier structure comprising one or more actuators configured for moving said deskinner in a generally horizontal direction between a retracted position and an advanced position.

13. The pig shank deskinner unit of claim 11, said pig part support being mounted to said deskinner carrier structure so as to be positionable relative to said knife.

14. The pig shank deskinner unit of claim 13, wherein said pig support is defined by individually positionable segments arranged to support a leading edge and a trailing edge, respectively, of said pig shank when said knife is moved to said lower position.

15. The pig shank deskinner unit of claim 11, comprising a pressing device for pressing said pig shank suspended from above said pig part deskinner unit against said pig part support.

16. The pig shank deskinner unit of claim 11, said skin gripper being a rotatable roller with teeth, said deskinner comprising a drive for rotating said rotatable roller.

17. The pig shank deskinner unit of claim 11, said deskinner comprising a chute for delivery by gravity of said skin from said skin gripper.

* * * * *